(12) United States Patent
Martin

(10) Patent No.: US 6,183,098 B1
(45) Date of Patent: Feb. 6, 2001

(54) VEHICLE EXTERIOR MIRROR

(75) Inventor: Anthony Martin, Bognor Regis (GB)

(73) Assignee: Britax Wingard Limited, Warwick (GB)

( * ) Notice: Under 35 U.S.C. 154(b), the term of this patent shall be extended for 0 days.

(21) Appl. No.: 09/420,971

(22) Filed: Oct. 20, 1999

(30) Foreign Application Priority Data

Oct. 22, 1998 (GB) .................................................. 9822995

(51) Int. Cl.⁷ .................................................. G02B 7/182
(52) U.S. Cl. .......................... 359/871; 359/872; 359/874; 359/841
(58) Field of Search .................................... 359/871, 872, 359/874, 841, 875, 876; 248/476, 474, 477, 479, 496, 473, 475

(56) References Cited

U.S. PATENT DOCUMENTS

| 3,765,054 | * | 10/1973 | Johnson | .................................. | 16/140 |
| 5,297,823 | * | 3/1994 | Dubost | .................................. | 285/317 |
| 5,331,471 | * | 7/1994 | Gilbert | .................................. | 359/874 |
| 5,432,640 |   | 7/1995 | Gilbert et al. . | | |
| 5,639,054 | * | 6/1997 | Gerndt et al. | .......................... | 248/478 |

FOREIGN PATENT DOCUMENTS 0 173 113 A1    2/1985   (EP) .

* cited by examiner

*Primary Examiner*—Mohammad Y. Sikder
(74) *Attorney, Agent, or Firm*—Jones, Day, Reavis & Pogue

(57) ABSTRACT

The mirror head of a vehicle exterior mirror has a hollow cylindrical bearing which is journalled on a spigot. The spigot has radially outwardly projecting detents on its outer end which engage with a shoulder on the bearing to retain the mirror head on the spigot. Slots divide the outer end of the spigot into lobes which are resiliently bendable inwardly to allow the detents to move past the shoulder. After assembly, a cylindrical blocking element is inserted into the spigot to block inward bending movement of the lobes.

18 Claims, 2 Drawing Sheets

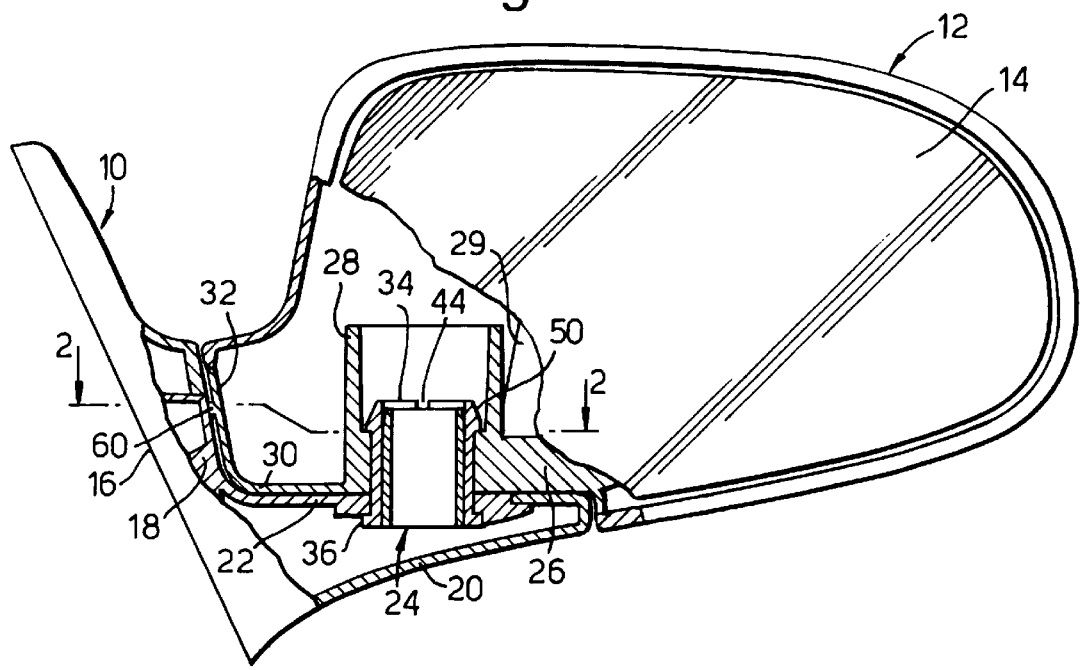
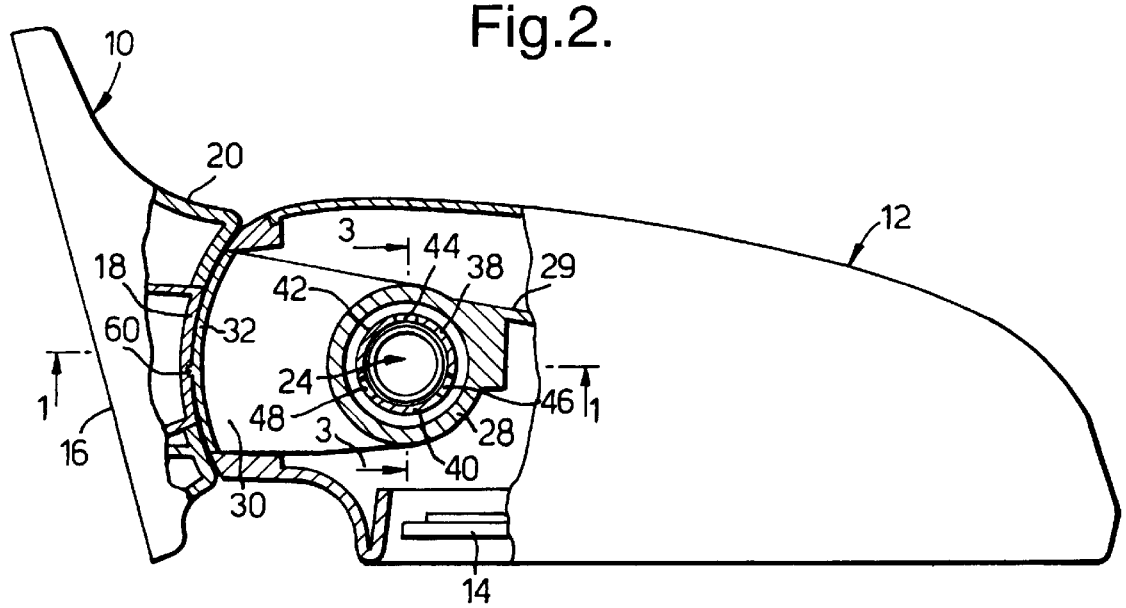

VEHICLE EXTERIOR MIRROR

FIELD

This invention relates to an exterior mirror assembly for a motor vehicle comprising a mirror head in which a reflective member is mounted, a base including a support surface for the mirror head, and a cylindrical spigot having an outer end projecting from the support surface into the mirror head, wherein the mirror head includes a hollow bearing which is journalled on the spigot.

RELATED ART

Exterior mirror assemblies of this type are described in U.S. Pat. No. 5,432,640 and European Patent Office Specification No. 0173113-A.

SUMMARY OF THE INVENTION

According to the invention, the spigot comprises a cylindrical member having a plurality of circumferentially-spaced radially outwardly projecting detents engaged with said bearing shoulder to retain the mirror head on the spigot, said detents projecting radially outwardly beyond said cylindrical inner bearing surface and being resiliently deformable inwardly to permit insertion of said cylindrical member into said hollow bearing until said detents snap outwardly into co-operative relationship with said bearing shoulder.

BRIEF DESCRIPTION OF THE DRAWINGS

FIG. 1 is an elevational view of a mirror assembly in accordance with the invention from the side which is viewed by a user, partially broken-away along the line 1—1 in FIG. 2;

FIG. 2 is a plan view of the mirror assembly shown in FIG. 1, partially broken-away along the line 2—2 in FIG. 1;

DETAILED DESCRIPTION OF THE PREFERRED EMBODIMENT

Figure 3:
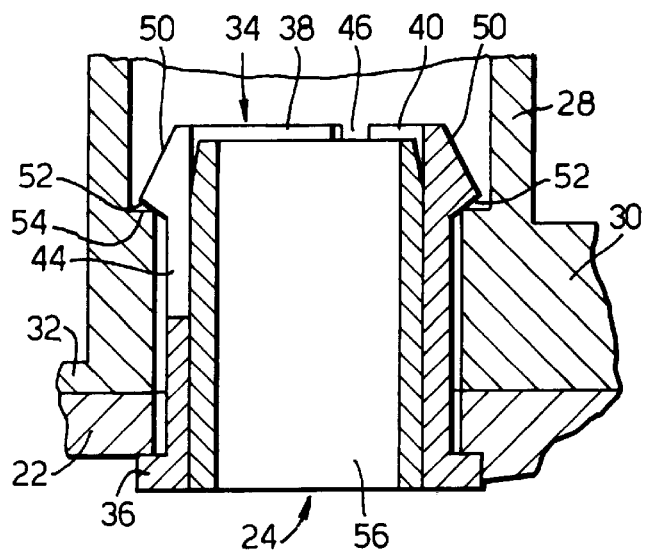
FIG. 3 is a scrap sectional view to an enlarged scale of part of the mechanism, taken on the line 3—3 in FIG. 2.

FIGS. 1 and 2 show an exterior mirror comprising a base 10 and a mirror case 12 containing a reflective member in the form of a silvered mirror glass 14. The base 10 has an abutment face 16 adapted to abut against a motor vehicle body and comprises a rigid base chassis 18 enclosed by a moulded plastics base cover 20. The chassis 18 includes a laterally projecting platform 22 containing a circular through hole for receiving a spigot 24, as will be described in more detail hereinafter.

The mirror head 12 has a rigid frame 26 comprising a hollow cylindrical portion 28 which is journalled on the spigot 24, an outwardly projecting portion 29 on which the mirror glass 14 is mounted in a conventional manner, and an inwardly projecting portion 30 supporting a generally vertically extending flange 32 which confronts the base chassis 18.

As can be seen from FIG. 3, the spigot 24 comprises a hollow cylindrical body 34 having a shoulder 36 on its bottom end which engages with the lower surface of the platform 22. The upper end of the body 34 is divided into three arcuate lobes 38, 40 and 42 by vertical slots 44, 46 and 48 which extend about half way down the body 34. Each lobe 38, 40, 42 carries a respective radially outwardly projecting detent, each of which has an upper surface 50 inclined at about 25° to the cylinder axis of the spigot, and a lower surface 52 inclined at about 70° to the cylinder axis of the spigot 24.

When the mirror head 12 is to be assembled on the base 10, the holes for the spigot in the platform 22 and the cylindrical portion 28 of the frame 26 are aligned with one another. The spigot 24 is then inserted from the bottom, the inclined surfaces 50 engaging with the edges of the hole in the platform 22 so as to deflect the lobes 38, 40 and 42 inwardly. When the detents have passed a shoulder 54 on the inner wall of the cylindrical portion 28, the lobes move outwardly to their original position, the lower inclined surfaces 52 engaging with the edge of the shoulder 54 so as to hold the cylindrical portion 28 centrally with respect to the spigot 24. Next, a cylindrical insert 56, which is an interference fit within the body 34 of the spigot 24, is inserted from the bottom so as to prevent subsequent inward displacement of the lobes 38, 40 and 42, thereby preventing separation of the mirror head 12 from the base 10.

Figure 4:
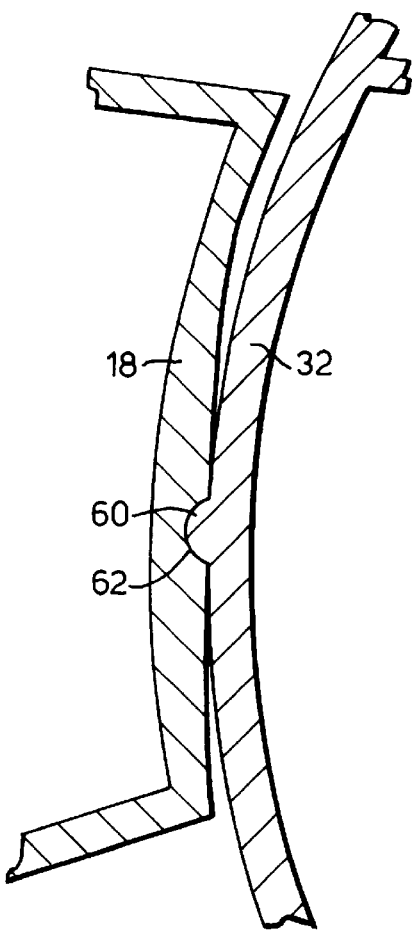
FIG. 4 is a scrap sectional view to an enlarged scale of part of the mechanism taken on the line 2—2 in FIG. 1.

In order to maintain the mirror head 12 at a desired orientation relative to the base 10, the flange 32 has a projecting detent formation 60 (FIGS. 1, 2 and 4) which engages in a correspondingly shaped recess 62 in the confronting face of the base chassis 18. If sufficient force is applied to the outer end of the mirror case, the flange 32 bends relative to the inwardly projecting portion 30 so that the detent 60 can disengage from the recess 62, allowing the mirror head 12 to pivot about the spigot 24. The force required to cause such disengagement is determined by the height of the detent 60 above the inwardly projecting portion 30. If desired, the force required to bend the flange 32 can be reduced by forming vertically extending slots therein.

What is claimed is:

1. An exterior mirror assembly for a motor vehicle comprising a mirror head in which a reflective member is mounted, a base including a support for the mirror head, and a cylindrical spigot having an outer end projecting from the support into the mirror head, the mirror head including a hollow bearing which is journalled on the spigot and has a bearing shoulder and a cylindrical inner bearing surface, wherein the spigot comprises a cylindrical member having a plurality of circumferentially-spaced radially outwardly projecting detents engaged with said bearing shoulder to retain the mirror head on the spigot, said detents projecting radially outwardly beyond said cylindrical inner bearing surface and being resiliently deformable inwardly to permit insertion of said cylindrical member into said hollow bearing until said detents snap outwardly into co-operative relationship with said bearing shoulder.

2. The assembly of claim 1 wherein said cylindrical member is hollow and a blocking element is received therein to prevent inward deformation of said detents and maintain said detents in co-operative relationship with said shoulder.

3. The assembly of claim 2 wherein said blocking element comprises a cylindrical insert that is slidably received within said hollow cylindrical member.

4. The assembly of claim 1 wherein said cylindrical member has a hollow end portion, a plurality of circumferentially-spaced axially extending slots in said hollow end portion that provide a plurality of resilient lobes, and said detents projecting radially outwardly from said lobes.

5. The assembly of claim 1 wherein said detents have inclined surfaces engaging said bearing shoulder and exerting forces that urge said base support and said mirror head together.

6. The assembly of claim 1 wherein said support has a hole therethrough aligned with said cylindrical inner bearing surface, said cylindrical member projecting through said hole into said hollow bearing, and said cylindrical member having an outwardly extending flange engaging said support around said hole.

7. The assembly of claim 1 including a co-operating projection and detent between said base and said mirror head for releasably holding said mirror head against rotation about said spigot relative to said base.

8. A rear view mirror assembly for attachment externally of a vehicle, said mirror assembly including a support base member and a mirror head member supported on said base member for swinging movement relative to said base member about a hinge joint, said hinge joint comprising a hollow bearing on one of said members, said hollow bearing having a cylindrical hole therethrough with a cylindrical inner bearing surface, said hollow bearing having a bearing shoulder extending outwardly from said inner bearing surface, a cylindrical member projecting from the other of said members into said cylindrical hole in said hollow bearing, said cylindrical member having a plurality of circumferentially-spaced detents extending radially outwardly therefrom in co-operative relationship with said shoulder to prevent separation of said mirror head from said base, said detents projecting radially outwardly beyond said cylindrical inner bearing surface and being resiliently deformable inwardly to permit insertion of said cylindrical member into said cylindrical hole in said hollow bearing until said detents snap outwardly into co-operative relationship with said shoulder.

9. The assembly of claim 8 wherein said cylindrical member has a plurality of circumferentially-spaced resilient fingers extending axially thereof and said detents are on said fingers, said bearing shoulder and said detents having co-operating cam surfaces thereon, and said fingers being under bending stress to urge said base and said mirror head together axially of said cylindrical member.

10. The assembly of claim 8 wherein the other of said members has a circular hole therethrough aligned wit said cylindrical hole in said hollow bearing, said cylindrical member extending through said circular hole into said cylindrical hole, and said cylindrical member having an outwardly extending flange thereon on the opposite side of said circular hole from said hollow bearing.

11. The assembly of claim 8 wherein said cylindrical member has an axial hole therein, and a blocking member received in said axial hole for blocking radially inward deformation of said detents to prevent movement of said detents out of co-operative relationship with said shoulder.

12. The assembly of claim 8 wherein said hollow bearing is on said mirror head.

13. The assembly of claim 12 wherein said base has a support wall on which said mirror head is supported and said cylindrical member extends from said support wall into said cylindrical hole in said hollow bearing.

14. The assembly of claim 13 wherein said support wall has a circular hole therein through which said cylindrical member extends, said cylindrical member has an outwardly extending flange therein on the opposite side of said support wall from said hollow bearing.

15. The assembly of claim 14 wherein said cylindrical member has a plurality of circumferentially-spaced axially extending resilient fingers thereon and said detents are on said fingers.

16. The assembly of claim 15 wherein said detents and said shoulder have co-operating cam surfaces thereon and said fingers are under bending stress to apply forces for urging said base and mirror head together axially of said cylindrical member.

17. The assembly of claim 16 wherein said cylindrical member is hollow and further including a blocking member received in said cylindrical member for blocking inward bending of said fingers to prevent movement of said detents out of co-operative relationship with said shoulder.

18. The assembly of claim 17 including a co-operating projection and detent between said base and said mirror head for releasably holding said mirror head against rotation relative to said base.

\* \* \* \* \*